Feb. 13, 1962 R. L. SAMSON 3,020,649
SIMULATED RADIO NAVIGATIONAL AIDS MARKER RECEIVER
Filed Oct. 28, 1958 4 Sheets-Sheet 1
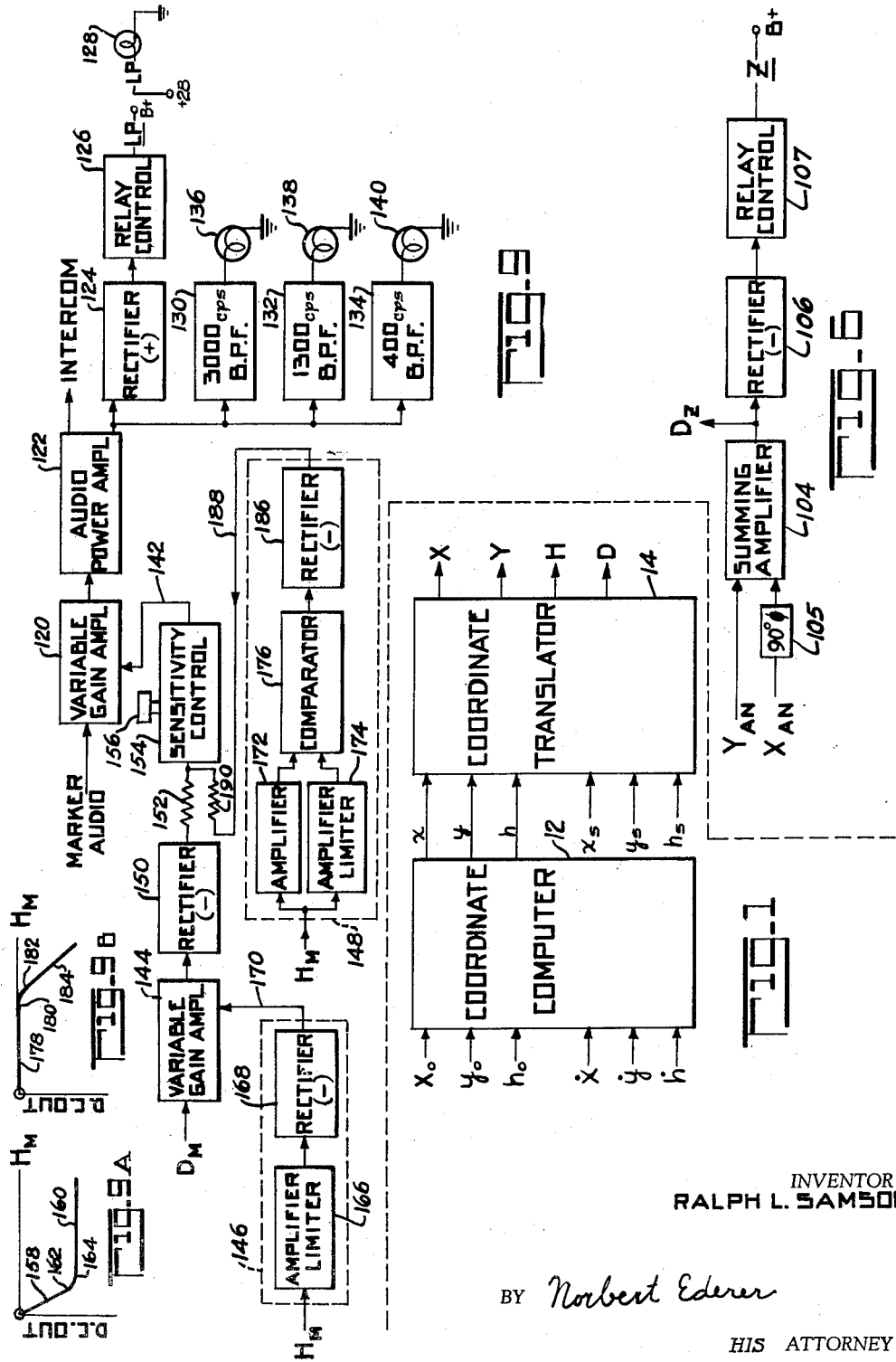
INVENTOR
RALPH L. SAMSON
BY Norbert Ederer
HIS ATTORNEY Feb. 13, 1962  R. L. SAMSON  3,020,649
SIMULATED RADIO NAVIGATIONAL AIDS MARKER RECEIVER
Filed Oct. 28, 1958  4 Sheets-Sheet 2
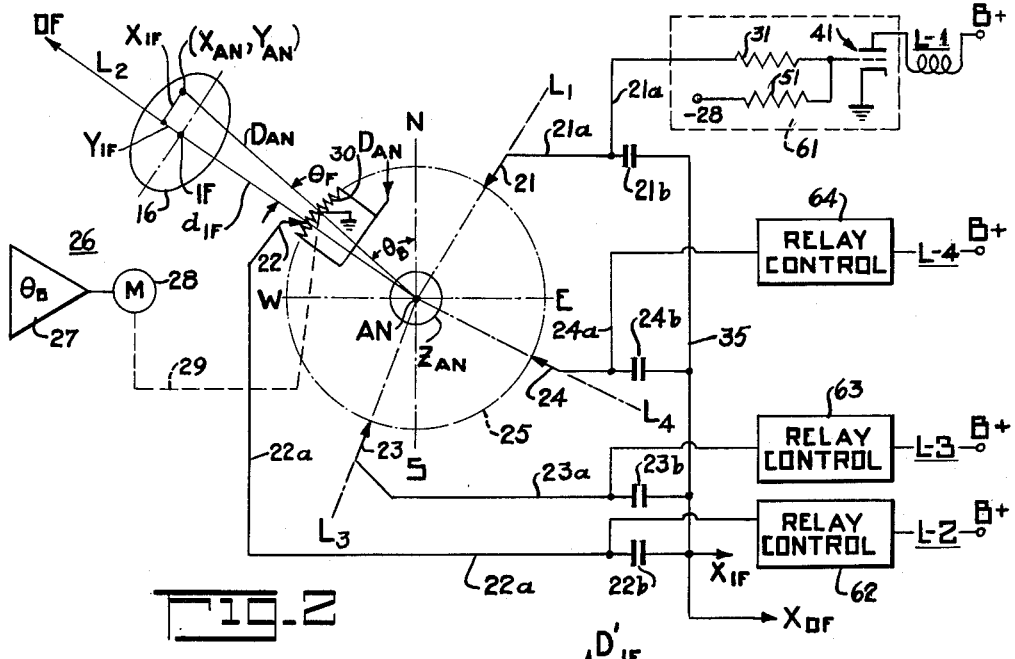
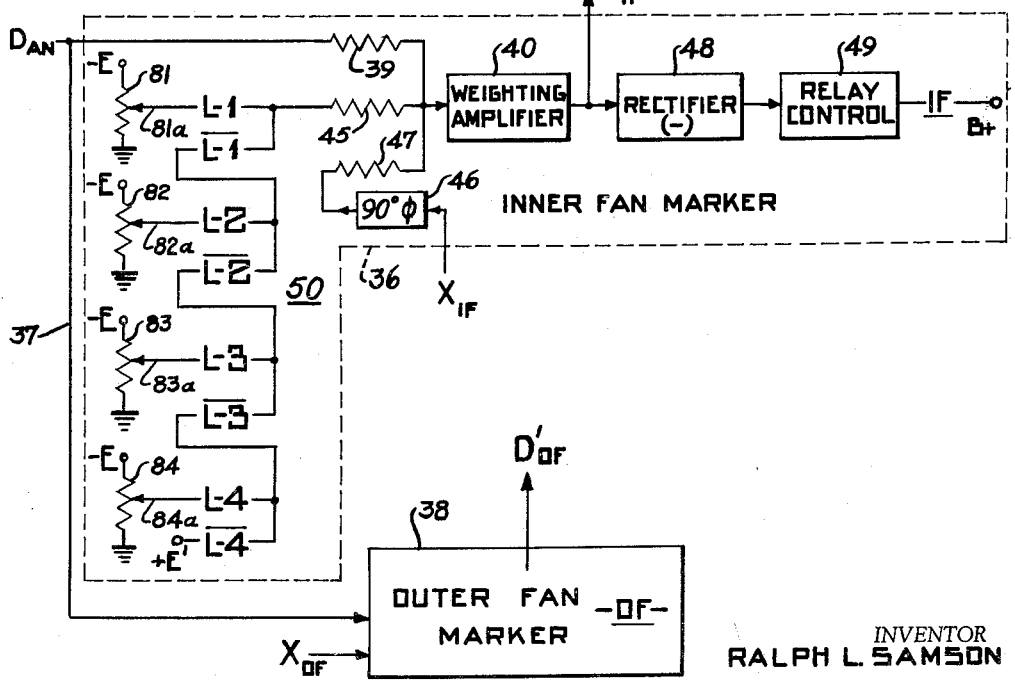
INVENTOR
RALPH L. SAMSON
BY Norbert Ederer
HIS ATTORNEY Feb. 13, 1962 R. L. SAMSON 3,020,649
SIMULATED RADIO NAVIGATIONAL AIDS MARKER RECEIVER
Filed Oct. 28, 1958 4 Sheets-Sheet 3
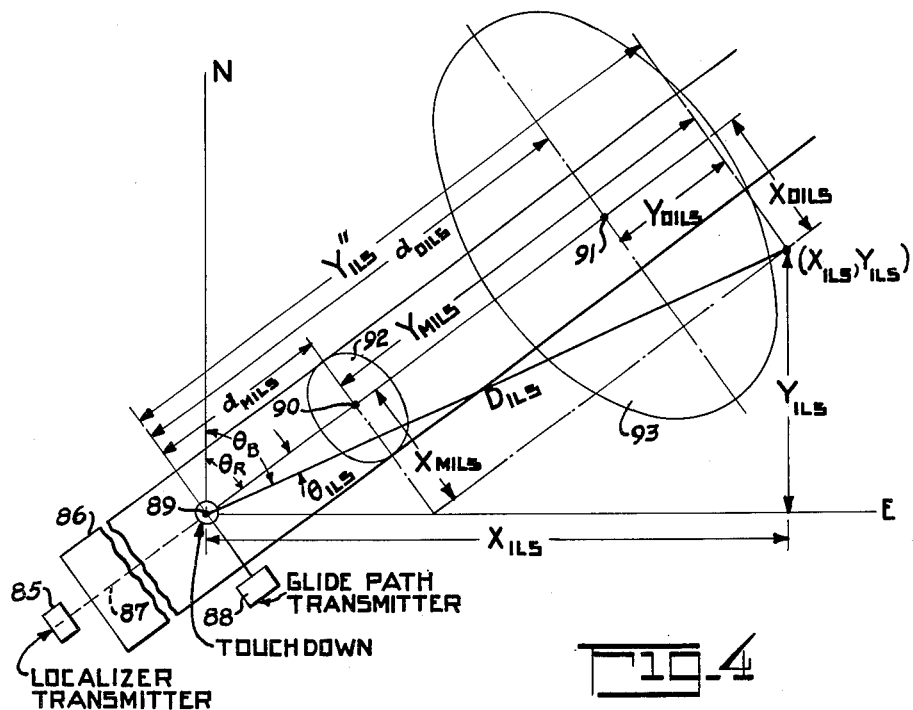
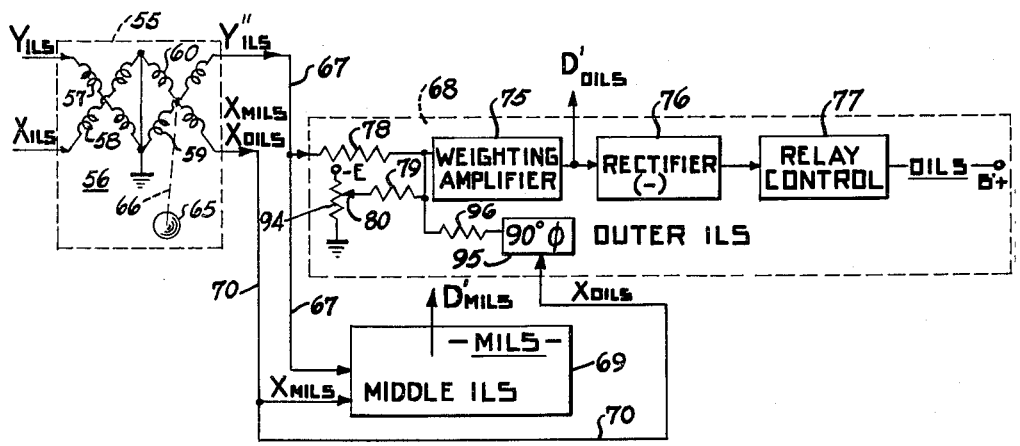
INVENTOR
RALPH L. SAMSON
BY Norbert Ederer
HIS ATTORNEY

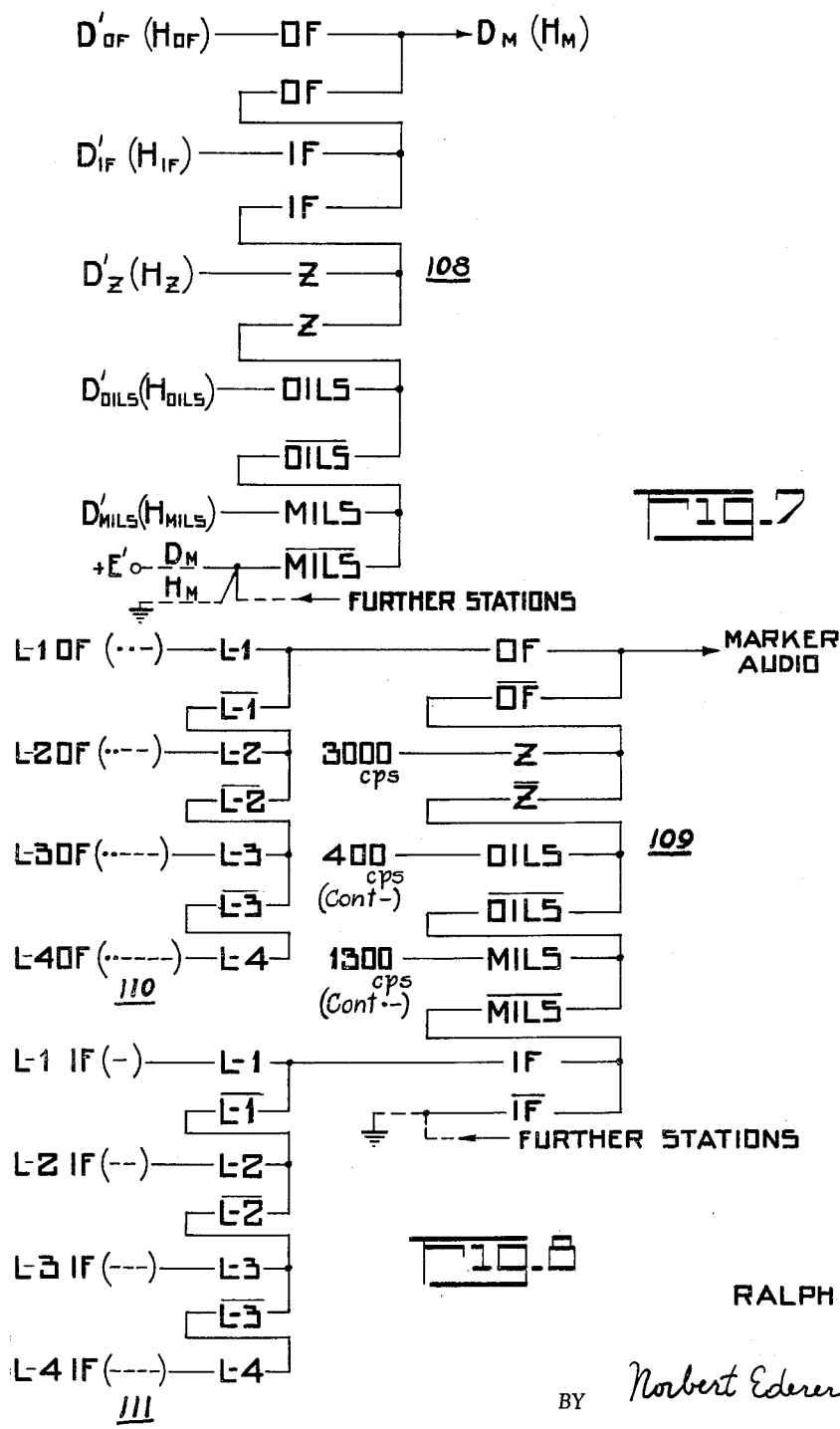

United States Patent Office 3,020,649
Patented Feb. 13, 1962

3,020,649
SIMULATED RADIO NAVIGATIONAL AIDS
MARKER RECEIVER
Ralph L. Samson, Wyckoff, N.J., assignor to Curtiss-Wright Corporation, a corporation of Delaware
Filed Oct. 28, 1958, Ser. No. 770,218
4 Claims. (Cl. 35—10.2)

This invention relates to flight training apparatus, and more specifically to apparatus for the training of prospective flight crews in the appreciation of so-called radio navigational aid "marker" signals employed in actual flight practice as aids for the pilot or navigator in determining the instant flight location with respect to radio navigational aids marker transmitting stations.

Radio marker simulating apparatus of the general type contemplated herein is known in the art, examples being the Patents 2,366,603, 2,475,314 and 2,494,508, granted to R. C. Dehmel on January 2, 1945, July 5, 1949, and January 10, 1950, respectively. A principal shortcoming of prior art apparatus has been rather inaccurate simulation of the marker radiation directivity patterns whereby erroneous impressions of conditions in actual flight practice were inculcated in the students. A further disadvantage of prior art apparatus has been the lack of proper synchronism of arrival of the fictitious flight within the relatively narrow broadcast range of the marker transmitting stations and reception of the marker signals, the latter lagging the former. This has resulted in further erroneous impressions as to conditions in actual flight practice. Such errors are especially serious in the case of instrument landing, where even a slight deviation might result in crash of the flight.

Accordingly it is a principal object of the present invention to provide radio marker simulating apparatus that is highly realistic as respects accuracy of the marker radiation patterns and synchronism of reception of the marker signals with the progress of the flight or landing exercise.

The invention will be more fully set forth in the following description referring to the accompanying drawings, and the features of novelty will be pointed out with particularity in the claims annexed to and forming a part of this specification.

In the drawings:

FIG. 1 is a block diagram of flight coordinate computing and converting means;

FIG. 2 is partly a vectorial diagram representative of geographical relations of the flight location with respect to "fan" and "Z" marker transmitting stations associated with well-known AN range radio navigational aids station, and partly a schematic diagram of relay control circuitry sensing location of the simulated flight in proximity to the range legs of such AN range station;

FIG. 3 is a partly schematic and partly block diagram representation of circuitry responsive to location of the flight in proximity to the fan markers illustrated in FIG. 2;

FIG. 4 is a vectorial illustration of geographical relations applicable to the so-called ILS marker transmitting stations relative to the locations of the simulated flight and the landing field;

FIG. 5 is a block diagram of control circuitry responsive to proximity of the simulated flight to the ILS station illustrated in FIG. 4;

FIG. 6 is a block diagram of control circuitry responsive to proximity of the flight to the Z marker radio navigational aids transmitting station illustrated in FIG. 2.

FIGS. 7 and 8 are diagrammatic illustrations of switching circuitry for selecting the appropriate marker transmitting station instantly in question and also of the particular type of marker audio signal applicable to such station;

FIG. 9 is a block diagram of the simulated marker radio receiver proper including amplifying circuitry excited by the audio signal and automatically controlled in gain by the audio and coordinate signals available from the circuitry of the FIGS. 8 and 7 respectively; and FIGS. 9a and 9b are graphical representations of non-linear functions generated by circuit elements illustrated in FIG. 9.

In the present specification, the simulated flight, receiver transmitter, etc. are upon occasion recited with the adjective "simulated" omitted for brevity.

The receiving system in accordance with the invention employs audio signals which are replicas of the signals used in actual flight practice, and electronic (as distinguished from electro-mechanical) signals which vary the intensity of an audio amplifier system that ultimately energizes the aural receiving means. The automatic gain control signals are originally alternating analog signals, representative of the geographic locations of the flight and the fictitious marker signal transmitting station, and are subsequently rectified and filtered to provide the required direct voltages. This is done primarily to avoid resort to direct coupled amplifiers and their well-known drift problems; it should be understood that provision of a complete direct voltage system for the gain control voltages is within the scope of the invention. The direct voltage analog signals used herein have magnitude and polarity with respect to ground related to the magnitude and sign of the variables represented thereby linearly except for the generation of certain non-linear functions. The alternating voltage analog signals are generally of positive or negative "polarity," i.e. are generally either in phase with or in phase opposition to a fixed reference voltage; the phase is representative of the sign of the represented variable. The magnitude of the alternating analog voltages are similarly generally related linearly to the magnitude of the represented variable, except for the generation of non-linear functions. The operating frequency for the receiving system herein described is generally 60 cycle line frequency; unless otherwise specified an "A.C." voltage shall be deemed as of 60 cycle frequency.

The receiving apparatus in accordance with the invention also contemplates composite alternating voltage input-direct voltage output characteristics for the automatic gain control voltage, that are non-linear or composed of a plurality of linear segments, of different slopes. To this end the apparatus hereinafter described features non-linear electronic function generators.

In actual flight practice the transmitting frequency for the fan marker, Z marker and ILS marker signals described hereinafter is fixed at 75 megacycles. Accordingly a single receiver is provided for the reception of the marker signals that is fixed tuned to 75 megacycles. The pilot identifies the marker station signal actually received aurally by its audio frequency and coding, and visually by the lighting of respective marker lamps, and by reliance on other navigational aids determinative of his approximate instant location. The simulated radio marker system hereinafter described duplicates the mentioned aural and visual effects.

In the interest of simplifying the disclosure well-known circuitry is indicated in block form. Also relays and their contacts are illustrated by means of a simplifying convention described hereinafter, whereby to permit tracing of the circuitry and understanding of the logical functioning by inspection. The several blocks are interconnected by signal leads and a common ground wire, but the latter is omitted in the drawings for clarity.

Referring to FIG. 1, reference numeral 12 designates a coordinate computer, which accepts A.C. analog voltages $x_0$, $y_0$ and $h_0$ set by the instructor to correspond to the Cartesian coordinates of the point of departure of the training exercise, and further accepts from a flight computer A.C. analog voltages $\dot{x}$, $\dot{y}$ and $\dot{h}$ representing respectively velocity components of the simulated flight in the three Cartesian coordinate directions. Responsive to the input voltages applied thereto the computer 12 delivers A.C. analog voltages $x$, $y$ and $h$ to a coordinate translator or converter 14, which has applied thereto further instructor set A.C. analog voltages $x_s$, $y_s$ and $h_s$ corresponding to the Cartesian coordinates of the particular AN range or landing field radio station simulated. In response to the input voltages applied thereto, the coordinate translator 14 computes the instant location of the flight with respect to the selected radio aids station by delivering analog A.C. voltages X, Y, and H. These output voltages represent respectively the Cartesian coordinates of the flight referred to the particular station in question as origin; further the converter 14 provides an A.C. analog output signal D which represents the ground distance of the flight from the radio aids station, being equal to $\sqrt{X^2+Y^2}$.

The manner of derivation and generation of the various input and output voltages to the units 12 and 14 per se form no part of the present invention and are therefore not shown in detail. Briefly described the coordinate computer 12 integrates the $\dot{x}$, $\dot{y}$ and $\dot{h}$ voltages and adds thereto the voltages $x_0$, $y_0$ and $h_0$, thereby obtaining the voltages $x$, $y$ and $h$ respectively. The coordinate converter provides a translation of the origin by deriving X as $x-x_s$, Y as $y-y_s$, and H as $h-h_s$. For a more detailed description the general manner of computation of the units 12 and 14 reference is made to copending application of J. W. Steiner, S.N. 392,136, filed November 13, 1953, now Patent No. 2,878,585, granted on March 24, 1959. Also the origin translation technique will be described hereinafter with reference to FIGS. 3 and 5.

A computing system including coordinate computer 12 and coordinate translator 14 is provided for each ILS station and for each AN range station contemplated for the particular training exercise. Since both fan and Z markers are associated with an AN range station, a single coordinate computer and coordinate converter suffices for generation of both types of marker signals for such station. The individual X, Y, H and D signals of each station are utilized in the presently considered receiving apparatus as specified hereinafter.

FIG. 2, to which reference is now made, is illustrative of the significance of the output voltages of the coordinate translator 14. The instant location of the aircraft is designated as by $X_{AN}$, $Y_{AN}$; that of the origin of the system, the location of the AN range station as by AN. The circle $Z_{AN}$ designates the circular radiation pattern of the Z marker associated with the AN range station centered about the origin, and this pattern diminishes in intensity in the X—Y plane outwardly from the station. In the vertical plane the Z marker and also the fan and ILS marker radiation patterns are initially approximately conical with apex at the origin and at considerable elevation approximately cylindrical. The radiation diminishes in intensity with increasing height H above the station. Associated with the AN range radio aids station are the usual AN range legs designated as by $L_1$, $L_2$, $L_3$ and $L_4$ whose full significance is explained in the aforesaid Dehmel patents. An inner fan (IF) marker transmitting station and an outer fan marker (OF) transmitting station is located on each leg; the illustrated inner fan marker of leg $L_2$ is typical of the inner fan markers of the remaining legs and also of the outer fan markers of all four legs. The location of the inner fan marker of leg $L_2$ is indicated as by $d_{IF}$ at a predetermined distance from the AN range station. The radiation pattern of the inner fan marker station, and also of the outer fan marker station is elliptical as indicated by ellipse 16. The loci of constant radiation intensity in the X—Y plane are similar ellipses centered about the fan marker station with minor axis along the range leg; the radiation intensity diminishes with progressive enlargement of the ellipses. As illustrated the aircraft is assumed to be within range of the inner fan marker station IF by virtue of the location of the coordinates $X_{AN}$, $Y_{AN}$ as within ellipse 16. The angle included by the ground or bearing distance line $D_{AN}$ and range leg $L_2$ is referred to as the "fan angle" $\theta_F$; the bearing angle $\theta_B$ reflects aircraft bearing relative to the station and as illustrated is included between the Y (North-South) axis and line $D_{AN}$. For purposes of Z marker simulation the X and Y voltages are of primary significance. However for purposes of fan marker simulation it is further necessary to refer the coordinates of the instant aircraft location to the particular fan marker station in question; this necessitates a further translation and rotation of the origin. The X coordinate of significance for fan marker simulation is designated as $X_{IF}$; as such it is equal to $D_{AN} \sin \theta_F$, and the new Y coordinate of significance is designated as $Y_{IF}$; this is equal to $D_{AN} \cos \theta_F - d_{IF}$. In similar manner the coordinates referred to the outer fan markers station $X_{OF}$ and $Y_{OF}$ are determined by the insertion in the immediately preceding symbols of the subscript OF instead of IF. These considerations are applicable whether the flight is within or without the elliptical radiation pattern of the station. Accordingly it is readily seen that the distances $X_{IF}$ and $X_{OF}$ are the same.

The computing apparatus described immediately hereinafter presupposes a maximum fan angle $\theta_F$ for reception of the fan marker signal of $\pm 17°$ or $\pm 0.2967$ radian; this is the maximum angular spread presently employed in actual flight practice. As will be seen hereinafter, when the distances $X_{IF}$ and $Y_{IF}$ (or $X_{OF}$ and $Y_{OF}$ as the case may be) fall outside the maximum broadcast range of the respective inner fan marker or outer fan marker station respectively, the marker receiver will necessarily be silent. The exact magnitudes of the $X_F$ and $Y_F$ coordinates are of no significance when the flight is outside the broadcast range, that is with the receiver silent. The exact magnitudes are only of significance when the flight is within the broadcast range of the particular fan marker station in question. Even at the limits of $\pm 0.2967$ radian, $\cos \theta_F$ is unity and $\sin \theta_F = \theta_F$ expressed in radians with an error of less than 4%. Consequently the computing apparatus computes $X_{IF} = X_{OF}$ as equal to $D_{AN} \theta_F$, $Y_{IF}$ as equal to $D_{AN} - d_{IF}$ and $Y_{OF}$ as equal to $D_{AN} - d_{OF}$.

To this end there are provided four potentiometer-brushes or wipers 21–24 which are positionable by the instructor along the dashed circle 25 with origin at AN to correspondence with the supposed range legs $L_1$–$L_4$ respectively as indicated by the coincidence of the brushes and respective range legs. A bearing servo generally indicated as by 26, of which one is provided for each AN range station, includes a servo amplifier 27 and a servo motor 28 energized by the latter. This servo assumes a position in accordance with the bearing angle $\theta_B$. The manner of energization and further details of construction of servo amplifier and servo motor are illustrated in the aforesaid Steiner patent. The motor 28 drives through mechanical connections 29, which include suitable gear reduction (not shown) an arcuate potentiometric element 30 along the periphery of circle 25. The arrangement is such that the grounded center tap of element 30 is positioned to the bearing angle $\theta_B$ as computed by the servo 26. The arcuate span of element 30 is $\pm 17°$ on either side of the grounded center tap to correspond to the aforesaid $\pm 17°$ maximum span of the fan angle $\theta_F$. In view of the aforementioned approximation of $\sin \theta_F = \theta_F$, the element 30 may be of uniform contour for derivation of the $\theta_F$ voltage as determined by its position relative to the engaged one of the brushes 21–24, in particular as indicated to the brush 22. The potentiometric element 30 is energized at both ends by the voltage $D_{AN}$ of positive reference phase, this voltage is derived from the associated converter 14 appropriate to the AN range in question corresponding to the illustrated distance $D_{AN}$. Thus when the simulated flight is flying directly over the range leg the voltage derived by brush 22 is 0 volts, and increases linearly in magnitude in either direction as the angle $\theta_F$ increases on either side from the range leg. If desired the exact sinusoidal contour may be provided for element 30. When the fan angle $\theta_F$ exceeds ±17°, the appropriate brush, herein brush 22 is totally disconnected from the element 30.

The brushes 21–24 connect to control circuitry, of which the circuitry associated with range leg $L_1$ is typical; the remaining circuits associated with range legs $L_2$–$L_4$ may be recognized by correspondence of reference numerals, with the units' digit 2, 3, 4 replacing the units' digit 1 of the range leg $L_1$ circuitry.

Brush 21 connects to an outgoing line 21a through a resistor 31 to the grid of a relay control tube 41 which is normally biased to cut off because of the connection of the grid also through a resistor 51 to a −28 volt bias source. This, in further view of the normal disconnection of the brush 21 from element 30 and the grounding of the cathode of tube 41, is sufficient normally to cut off tube 41. As soon as brush 21 engages any part of element 30, direct voltage-wise the left end of resistor 31 is connected to ground, and this reduces the grid bias sufficiently to render tube 41 conductive, thereby energizing a relay designated as by L–1 that is connected between the plate of tube 41 and a B+ direct supply voltage. The fact that an alternating signal component also appears on line 21a is of no significance in the energization of relay L–1 as this signal is sufficiently small to render the relay insensitive thereto.

The relay control circuitry comprising resistors 31 and 51 and tube 41 is typical of the relay control circuits 62, 63 and 64 (connected to the remaining range legs via lines 22a–24a respectively), which are therefore illustrated in block form. Further the corresponding relay coils L–2, L–3 and L–4 are indicated merely by like-named reference characters underlined with the conventional symbol for the relay coil omitted. The same convention is also applicable to the further relays hereinafter referred to. Further to the end of facilitating comprehension of the logical arrangement, the "normally closed" (NC) contacts of a particular relay are identified by the reference letter of the relay coil with a bar thereabove, whereas the "normally open" (NO) contacts of such relay are identified simply by the same reference letter without bar above or below. These conventions are similar to those used in the U.S. Patents 2,750,986 and 2,771,600. "Normalcy" as considered herein refers to the state of the relay were all sources of energization removed. Generally energization rather than deenergization of a relay signifies that the function reflected by the relay designation is performed, and this renders "normalcy" consistent with the "normal" state of disconnection of the brushes 21–24.

The brushes 21–24 are further connected through respective blocking capacitors 21b–24b to a common line 35, from which the fan angle representative voltage of the particular brush engaging the element 30 is available. This voltage, as is apparent from previous considerations, serves at once as the voltage $X_{IF}$ and $X_{OF}$ for utilization in the receiver apparatus hereinafter described.

The circuitry of FIG. 3, to which reference is now made, is associated with the fan marker control circuitry for the AN range station of FIG. 2 and hence one each such circuitry is provided for each AN range station simulated. The circuitry of FIG. 3 is employed for the generation of the voltages $Y_{IF}$ and $Y_{OF}$. These voltages are "weighted elliptically" in relation to the corresponding $X_{IF}$ and $X_{OF}$ voltages, and then combined vectorially with the latter to obtain "weighted" distance voltages $D'_{IF}$ and $D'_{OF}$ for utilization ultimately in the circuitry of the receiver proper, illustrated in FIG. 9.

The elliptical weighting arises out of the elliptical radiation pattern of the fan markers. This necessitates multiplying a Y voltage by a factor equal to the major to minor axis ratio of the ellipse in relation to the corresponding X voltage, whereby the Y voltage is accorded the proper weight relative to such X voltage. This is readily apparent by assuming that the flight traces out a path along an ellipse of constant radiation intensity; although the actual distance from the fan marker station varies along such ellipse, the weighted distance $D'_{IF}$ or $D'_{OF}$ remains constant.

The $D_{AN}$ voltage utilized in the circuitry of FIG. 2 is applied to an inner fan marker system 36 and also via line 37 to an outer fan marker system 38. The latter is entirely analogous to the former and is therefore illustrated merely in block form. With reference to the inner marker system 37, the $D_{AN}$ voltage is applied through a summing resistor 39 to the input of a weighting amplifier 40 which also receives over a further summing resistor 45 an A.C. analog voltage representative of the distance $d_{IF}$ associated with the particular one of the four range legs whose respective wiper of the series 21–24 is then engaged by the potentiometric element 30. The $D_{AN}$ and $d_{IF}$ voltages are of fixed and opposite phases, so that the input to the weighting amplifier 40 due to these voltage contributions represents $D_{AN}-d_{IF}$, which in effect is $Y_{IF}$ when the flight is within broadcast range of the fan marker, as previously explained.

The $X_{IF}$ voltage is applied to a 90° phase shift network 46, whose output connects to the input of the weighting amplifier 40 through a further summing resistor 47, which is proportioned in relation to the summing resistors 39 and 45 so as to accord elliptical weighting to the $Y_{IF}$ input voltage. The summation of input voltages to the amplifier represents the weighted distance of the flight from the station IF, and such voltage is made available for utilization in the circuitry of FIGS. 7 and 9 at the output of amplifier 40 in amplified form, designated as $D'_{IF}$.

The output of amplifier 40 is further applied to a half wave or full wave rectifier 48 which is arranged to rectify the negative peaks of the incoming wave and is equipped with the usual filter network. The rectified output voltage of the latter serves as control voltage for relay control circuitry 49 that is similar to the relay control circuits 61–64, differing therefrom only in the respect that the input voltage to circuitry 49 is inherently negative, and is normally sufficiently large to cut off the relay control tube in unit 49 without necessity of negative bias. When the aircraft gets within broadcast range of the inner fan marker station, the voltage $D'_{IF}$ is of a magnitude sufficiently small to render relay control tube 49 conductive thereby to energize the indicated IF relay connected in its plate circuit.

To the end of generating the $d_{IF}$ voltages there are provided potentiometers 81–84 associated respectively with the four range legs. Each of these potentiometers is energized at one end by the A.C. reference voltage −E and is grounded at its opposite end. The potentiometers are provided with respective wipers 81a–84a, which are positioned by the instructor in accordance with the respective $d_{IF}$ distances. The wiper derived voltages are selectively fed to resistor 45 through the illustrated alternative circuit arrangement 50. The selection of a particular wiper derived voltage requires energization of its associated L relay and necessarily deenergization of the L relays of the remaining legs. Thus the voltage of wiper 81a is applied to resistor 45 through the indicated NO contact of the L–1 relay; that of the wiper 82a through the indicated NO contact of the L–2 relay in series with the indicated NC contact of relay L–1; that of the wiper 83a through the indicated NO contact of relay L–3 in series with the indicated NC contacts of the relays L–2 and L–1; and that of the wiper 84a through the indicated NO contact of the L–4 relay in series with the indicated NC contacts of the L–3, L–2 and L–1 relays. It is readily seen that the subtraction from the $D_{AN}$ voltage of the selected $d_{IF}$ voltage represents translation of the origin of FIG. 2 to the particular inner fan marker station; this is illustrative of the translation technique employed in co-ordinate converter 14 (FIG. 1). In the event of deenergization of all four L relays, a fixed reference voltage $+E'$ of relatively large magnitude and positive phase is applied through the indicated NC contacts of the four L relays in series to resistor 45 and the resultant $D'_{IF}$ voltage is sufficiently large ultimately to silence the receiver and also to deenergize the IF relay.

The "alternative" circuit array 50 just described is typical of other alternative circuit arrays described hereinafter. Stated more generally a particular range leg voltage in the series constituting the array is routed through the NO contact of the relay associated therewith and then through the NC contacts of the relays preceding such particular relay in the array.

The outer fan marker system 38 is provided internally with a set of potentiometers similar to potentiometers 81–84, that are set by the instructor in accordance with the respective distances $d_{OF}$. Otherwise the circuitry is identical; the unit 38 accepts $D_{AN}$ and $X_{OF}$ voltages and delivers a weighted $D'_{OF}$ voltage. It is equipped with an OF relay that is analogous to the IF relay.

For consideration of the geographical relations governing ILS marker simulation reference is now made to FIG. 4. The complete radio aids system associated with an ILS station includes a localizer transmitter 85, which is located towards the rear of the runway 86 at the mid-longitudinal axis 87 thereof, a glide path transmitter 88 located to the side of the runway in alignment with a point of touchdown 89, also located on axis 87, a middle ILS marker transmitter 90 located on axis 87 at a predetermined distance $d_{MILS}$ from the point of touchdown, and an outer ILS marker transmitter 91 located on axis 87 at a predetermined distance $d_{OILS}$ from point of touchdown 89. The transmitters 85 and 88 form no part of the presently described system; their functions are described in the aforesaid Dehmel patents. The origin of the two-dimensional ILS marker system is the point of touchdown 89, and the coordinates of the flight are indicated as by $X_{ILS}$, $Y_{ILS}$, the ground or bearing distance is indicated by $D_{ILS}$, the bearing angle formed by the North-South (Y) axis and line $D_{ILS}$ by $\theta_B$, the runway angle $\theta_R$ formed by the Y-axis and line 87, and the "approach bearing angle" or "runway heading angle" included by lines 87 and $D_{ILS}$ as by $\theta_{ILS} = \theta_B - \theta_R$.

The radiation patterns of the middle and outer ILS markers are similar to those of the fan markers, elliptical in the X–Y plane and conical-cylindrical in three dimensions. This is indicated by respective ellipses 92 and 93 that are centered about transmitting points 90 and 91 respectively. Analogously to the case of the fan marker system previously described it is necessary to refer the aircraft coordinates to the ILS marker transmitters; the important geographical quantities are: $D_{ILS} \sin \theta_{ILS}$—this serves at once as the $X_{MILS}$ and $X_{OILS}$ distances indicated, i.e. the projection of line $D_{ILS}$ on a line passing through the flight coordinates and perpendicular to axis 87; the quantity $D_{ILS} \cos \theta_{ILS}$ equal to the indicated distance $Y''_{ILS}$, i.e. the projection of line $D_{ILS}$ on the axis 87; and finally the indicated distances $Y_{MILS} = Y''_{ILS} - d_{MILS}$, and $Y_{OILS} = Y''_{ILS} - d_{MILS}$. The latter two distances are the distances projected on axis 87 of the aircraft location referred to the inner and outer ILS marker stations. It is readily seen that the reference of the flight position to the point 90 and 91 is tantamount to translation of the origin 89 to points 90 and 91 respectively and to a rotation of axes through the angle $\theta_R$, such that the original Y axis coincides with line 87.

It can be shown upon trigonometric expansion, that (1) $\quad Y''_{ILS} = Y_{ILS} \cos \theta_R + X_{ILS} \sin \theta_R$ (2) $\quad X_{MILS} = X_{OILS} = X_{ILS} \cos \theta_R - Y_{ILS} \sin \theta_R$ Referring to FIG. 5, Equations 1 and 2 are mechanized by an axis rotator unit 55 that accepts the $X_{ILS}$ and $Y_{ILS}$ analog input voltages from the respective coordinate translator 14, and delivers the required analog output voltages $Y''_{ILS}$ and $X_{MILS} = X_{OILS}$. The axis rotator 55 includes a well known inductive resolver 56, whose stator windings 57 and 58 are arranged in space quadrature and have the voltages $Y_{ILS}$ and $X_{ILS}$ applied to respective left ends, their right ends being grounded. The rotor windings 59 and 60 of resolver 56 are also arranged in space quadrature, have their left ends grounded and deliver at respective right ends the required voltages $Y''_{ILS}$ and $X_{MILS} = X_{OILS}$ provided the rotor is displaced through an angle $\theta_R$ from a reference position corresponding to the North-South axis. The displacement is effected by operation of an instructor's calibrated control knob 65 that is ganged to the rotor of resolver 56 by connections generally indicated as at 66.

The voltage $Y''_{ILS}$ is applied via line 67 to inputs of an outer ILS unit 68 and a middle ILS unit 69, and the voltage available from rotor winding 60 is applied over line 70 as an $X_{MILS}$ input to system 69 and as an $X_{OILS}$ input to system 68. The internal structure of unit 69 is analogous to that of unit 68 and is therefore illustrated merely in block form. The unit 68 in turn is analogous to the inner fan marker unit 36 and therefore requires but a brief description.

The unit 68 includes an elliptical weighting amplifier 75 analogous to amplifier 40, which delivers an effective distance signal $D'_{OILS}$ that takes into account the elliptical outer ILS marker radiation pattern. Further the amplifier 75 drives a rectifier and filter unit 76 providing rectification of negative peaks and analogous to rectifier 48. The negative D.C. output voltage of unit 76 normally cuts off a relay control tube 77 analogous to unit 49, thereby normally deenergizing an OILS relay connected in its plate circuit. When the effective distance $D'_{OILS}$ is within broadcast range of the outer ILS marker located at 91 (FIG. 5), the bias voltage provided by unit 76 is of sufficiently small magnitude, relay control tube 77 conducts and the OILS relay is energized.

The weighting amplifier 75 receives over a summing resistor 78 the voltage $Y''_{ILS}$ and over a second summing resistor 79 an analog voltage corresponding to $-d_{OILS}$. The combination of these two voltages $Y''_{OILS} - d_{OILS}$ represents translation of the origin of the X—Y coordinate system of FIG. 4 to the point 91. The $-d_{OILS}$ voltage is derived from the slider 80 of a potentiometer 94 that is connected at opposite ends to the aforesaid A.C. reference voltage source $-E$ and ground. The slider 80 is positioned by the instructor in accordance with the supposed distance $d_{OILS}$.

The $X_{OILS}$ voltage is applied to a 90° phase shift network 95, and as phase shifted through a third summing resistor 96 to the input of amplifier 75. The resistor 96 is selected with reference to resistors 78 and 79 to obtain the effective voltage $D'_{OILS}$ at the output of amplifier 76, i.e. the said three resistors are weighted elliptically whereby the voltage $D'_{OILS}$ remains of constant magnitude for a flight path along ellipse 93.

In analogous manner the middle ILS unit 69 delivers a middle ILS effective distance voltage $D'_{MILS}$ referred to point 90. The unit is provided with analogously functioning middle ILS relay MILS.

The Z marker control relay system is illustrated in FIG. 6 to which reference is now made. It is principally analogous to the outer ILS unit 68, but of much simpler construction owing to the absence of necessity to translate the origin, to rotate axes, and to weight the input voltages $X_{AN}$ and $Y_{AN}$ elliptically. These voltages are derived from the same respective coordinate converter 14 which also supplies the required signals to the fan marker systems of FIGS. 2 and 3, the fan and Z markers being associated with the same AN range station.

The $Y_{AN}$ signal is applied directly to a summing amplifier 104, whereas the $X_{AN}$ voltage is first shifted 90° in phase by a network 105 prior to application to amplifier 104. The amplifier 104 sums the two input voltages vectorially and delivers at its output analog voltage $D_Z$ or $D_{AN}$ representing ground distance of the flight from the Z marker transmitter. Although this voltage is directly available from converter 14, it is preferable to recompute it electronically from the $X_{AN}$ and $Y_{AN}$ voltages in the interest of accuracy of magnitude and of synchronism of the receiver response with the progress of the flight.

The output voltage of amplifier 104 is applied to a rectifier unit 106 analogous to the units 48 and 76, and this provides the bias for a relay control tube 107 analogous to units 49 and 77, which maintains a D relay energized or deenergized in accordance with the flight position being inside or outside of the Z marker broadcast range.

The apparatus so far described has been mainly concerned with referring the X and Y voltages available from the respective coordinate converters 14 to the respective transmitters, the fan and ILS voltages being additionally weighted. The H voltages do not require reference to the station or weighting, and hence may be utilized in the form generated by the respective converter 14. As will be seen hereinafter with reference to FIG. 9, a single channel is provided for the several effective D and H voltages. To this end, referring to FIG. 7, there is provided circuitry for selection of the particular effective D and H voltages of instant significance during the flight training exercise. Only the D voltage selector circuitry is illustrated, the corresponding circuitry for the H voltages being substantially identical as signified by the parenthetical H quantities associated with the indicated D quantity. The voltage $D'_{OF}$, $D'_{IF}$, $D'_Z$, $D'_{OILS}$ and $D'_{MILS}$ are arranged in descending order in an "alternative" array 108 similar to the alternative array 50 previously described. Each of these voltages is provided with a possible output path through the indicated NO contact of the relay associated with such voltage in series with the NC contacts of any relays preceding in the array. The selectively connected output voltages are designated as $D_M$ and $H_M$ collectively. If none of the indicated relays are energized, in the case of the $D_M$ channel the aforementioned relatively large A.C. voltage $+E'$ is applied through the individual NC contacts of the MILS relay, the last in the array, and thence of the several remaining relays in series and as such contributes to receiver silence. In the case of the $H_m$ channel the respective NC contact of the MILS relay is grounded instead as indicated; as will be seen hereinafter, this further contributes to receiver silence. If further marker stations are to be added, instead of returning the indicated NC contact of the MILS relay to the voltage $+E'$ (or to ground in the case of the $H_m$ channel), such contact is connected to similar contacts associated with the further added station to expand the array 108, the last NC contact in the array being connected to the voltage $+E'$ in the case of the $D_M$ channel and to ground in the case of the $H_M$ channel.

Referring to FIG. 8, the various audio signals indicated therein are generated by suitable tone generators and keying apparatus described in the aforesaid Dehmel patents. The "marker audio" signal, which is applied to the receiver circuitry of FIG. 9, is a collective designation for the various available audio signals which are selectively connected through a further alternative circuit array indicated as at 109 which comprises in descending order contact sets of the relays OF, Z, OILS, MILS, and IF corresponding in designation to respective audio signals. The NC contact of the IF relay, the last in the array, is grounded if no further stations are provided; this silences the receiver. If further stations are added, the array 109 is expanded by the addition of similar contacts associated with further stations, the last NC contact in the array being grounded. The Z marker signal is a 3000 cycle note generated on a continuous basis through the indicated NO contact of the Z relay. The outer ILS marker is a 400 cycle tone that is keyed in Morse code by a continuous sequence of dashes that are periodically interrupted briefly before generation of a new sequence of continuous dashes. This signal is applied to the indicated NO contact of the OILS relay. The middle ILS marker system is a 1300 cycle note that is keyed by a sequence of alternate Morse code dot and dashes, the sequence being interrupted from time to time and followed by a similar sequence.

The outer fan marker range leg signals are selectively applied to the indicated NO contact of the OF relay from a further alternative array 110 of contacts of the range leg relays arranged in the descending order L-1 to L-4. In similar manner the inner fan marker signals are applied to the indicated NO contact of the IF relay from a further array 111 of contacts of the L-1 to L-4 relays in descending order. The individual fan marker signals are applied to NO contacts of the associated range leg relay. They are 3000 c.p.s. notes keyed in Morse code signals as indicated; thus for example the L-1 signal of the outer fan marker is dot-dot-dash. The remaining signals may be determined by inspection.

It is readily seen that a particular $D_M$ and associated $H_M$ signal is channeled through a quasi AND circuit. The associated effective $D_M$ ground distance must be sufficiently small to correspond to broadcast range; this will result in energization of the associated relay. Only upon such energization are such $D_M$ and $H_M$ voltages channeled through array 108. Transmission of the associated audio marker signal requires the same conditions precedent, and in the case of the range leg markers also requires energization of the associated range leg relay. It is apparent from previous considerations, that whenever either the OF or the IF relay is energized one of the range leg relays L-1 to L-4 must be energized, but the converse is not necessarily true as the distance $D'_{OF}$ or $D'_{IF}$ may be sufficiently large to deenergize the associated relay. For this reason it is unnecessary to provide for the conditions of deenergization of all four range leg relays in the arrays 110 and 111.

As will be seen immediately hereinafter, the quasi AND circuit further includes means taking into account the conical-cylindrical radiation pattern for producing perceptible receiver marker output signals.

Referring to FIG. 9 the marker audio signal selected by the switching circuitry of FIG. 8 is applied to an input of a variable gain amplifier 120 whose gain is automatically controlled, by means immediately hereinafter described, to take into account the conical radiation pattern and also the fading of the signal with distance from the marker transmitter. The amplifier 120 feeds an audio power amplifier 122, whose output is connected to an inter-communication system, which per se forms no part of the present invention and is therefore not shown. Such inter-communication system includes ultimately headphones or a speaker for aural perception of the marker signal.

In the case of military aircraft the amplifier 122 additionally drives a rectifier 124 arranged to rectify the positive peaks of the incoming signal and provided with the usual filter network. Unit 124 provides a positive signal for a relay control tube 126, which is biased to cutoff so as normally to maintain deenergized a lamp relay LP, connected in its plate circuit. The relay control circuitry 126 is similar in construction to the previously referred to relay control tubes. When the marker audio is of sufficient intensity, signifying location of a flight in close proximity to the marker transmitter, the LP relay is energized, thereby lighting an indicator light 128 through the illustrated circuit extending from the direct voltage source, through the NO contact of the LP relay and the lamp filament to ground. The indication by lamp 128 for all types of marker signals follows accepted practice for military aircraft. In commercial aircraft it is customary separately to identify the AN range markers, the outer ILS markers, and the middle ILS markers. To this end the amplifier 122 is alternatively connected to respective 3000 c.p.s., 1300 c.p.s. and 400 c.p.s. band pass filters 130, 132 and 134 whose outputs are connected through filaments of respecitve white, amber and blue lamps 136, 138 and 140 to ground. The latter three lights are energized by the filtered audio signal directly, rather than through relay contacts, provided that the respective audio signal is of sufficient intensity to signify close proximity to the marker station.

The amplifier 120 is of well-known structure; it comprises one or more stages of amplification that is varied in accordance with the magnitude of a negative bias signal applied to respective grids of the stages over line 142. The originating signal for varying the bias on line 142 are the selected $D_M$ signal applied to a similar varaible gain amplifier 144, and the selected $H_M$ signal applied to a nonlinear function generator 146 for purposes of simulation of the conical-cylindrical radiation pattern, and optionally additionally also to a second nonlinear function generator 148 for purposes of simulating the fading effect with increasing height above the station.

The output of the variable gain amplifier 144 is applied to the rectifier 150 which rectifies and filters the negative peaks of the incoming wave, and the output of unit 150 is fed through a summing resistor 152 to a sensitivity control 154 which is commonly a resistive attenuator providing for "normal intensity" attenuated output and alternative "high sensitivity" unattenuated output. This control is operated by the student by means of a control knob 156. The "high sensitivity" is selected when the student believes himself in proximity to a marker station and is desperately searching for the marker. The output of the sensitivity control 154 is fed to line 142 to the variable gain amplifier 120. With increasing effective distance $D_M$ from the marker transmitter, assuming constant height above the transmitter, the negative bias voltage on line 142 increases in magnitude and in the limit is effective to cut off amplifier 120; this results in receiver silence. Cutoff of amplifier 120 also results in the case of the large $D_M$ signal that obtains in the case of remote location of the flight from all available marker transmitting stations, as explained with reference to FIG. 7. The bias signal on line 142 must however be weighted "conically-cylindrically." When the flight is at a level corresponding to the apex of the cone of the radio beam, the limiting distance $D_M$ effective to cut off stage 120 is very small, and increases substantially linearly with increasing height above the station giving rise to the conical part of the radiation pattern. At increased height the limiting voltage $D_M$ for cut off of stage 120 is substantially constant giving rise to the cylindrical part of the radiation pattern.

The conical-cylindrical weighting is accomplished by means of the function generator 146, which generates the composite $H_M$ A.C. input-D.C. output function illustrated in FIG. 9a and denominated "limiter function." Referring to FIG. 9a, it is seen that with increasing $H_M$, the negative D.C. output voltage initially follows a substantially straight line relationship indicated as at 158; this gives rise to the conical weighting. Ultimately the response is substantially flat as indicated at 160; this gives rise to the cylindrical weighting. The limit 162 of the linear response range and the limit 164 of initial flat response range may, for purposes of the generic definition "limiter function" be joined by the illustrated rounded curve portion, or may coincide, or may consist of a succession of straight line segments of progressively decreasing slope. The generic definition of limiter function generation is intended to cover these various alternatives.

The function generator 146 includes an amplifier-limiter 166 which amplifies the incoming A.C. signal initially linearly, thereby giving rise to the linear response range 162, and thereafter clips the positive and negative peaks of the incoming wave symmetrically beginning with level 164. In the limit, as the $H_m$ signal increases to large magnitude, the clipping action converts the sine wave to a square wave, giving rise to the asymptotic response 160. The amplifier limiter 166 may comprise any well known clipper, such as one or more stages of amplifiers each biased approximately midway between cutoff and saturation, or may include a linear amplifier whose output is applied to a well-known clipper comprising biased diodes which do not clip until the peak value conforming to the bias values is exceeded. Alternatively the amplifier-limiter 166 may be a cathode coupled clipper amplifier described in Patent No. 2,821,629. The output of amplifier-limiter 166 is applied to a rectifier 168 which is arranged to rectify and filter the negative peaks of the incoming wave. The rectified signal is applied over line 170 as a negative bias to the variable gain amplifier 144. The bias signal characteristic is reflected in FIG. 9a. In the event that the flight is outside the broadcast range of all stations available in the training exercise, the input signal $H_M$ is zero as previously explained; this increases the gain of amplifier 144, further contributing to the large negative bias applied over line 142 to the variable gain amplifier 120 and thereby contributing to receiver silence.

It should be noted that for purposes of the invention the amplifier-limiter is not restricted to clipper circuits, nor is the generic definition of limiter function generator restricted to circuitry including clippers or limiters. For example the invention contemplates as an alternative to the circuitry within block 146 that the stage 166 comprise a plurality of amplifiers that do not limit, but rather have the output voltage of the rectifier 168 applied thereto as an automatic gain control signal in a manner similar to that of amplifiers 120 and 144. This alternative arrangement produces essentially the characteristics of FIG. 9a.

In actual practice the intensity of radiation will also decrease with increasing height above the station; however, in the marker radio receiver of the aircraft this effect will not be sensed until the height above the station is very large owing to the automatic volume control provided in the receiver. Accordingly, it is not absolutely necessary to provide for fading effects with increasing height. If desired, such feature is simulated by the nonlinear function generator 148 which has the composite $H_M$ input D.C. negative output voltage characteristic illustrated in FIG. 9b.

The function generator 148 includes a linear amplifier 172 and an amplifier-limiter 174 to whose inputs the $H_M$ signal is applied. Unit 174 may be of any of the previously or subsequently described types. The outputs of the stages 172 and 174 are fed to the input of comparison amplifier 176; to this end it is necessary in the present instance to provide within the amplifier-limiter 174 a low pass or band pass filter to restore the clipped waves to sine waves. The amplifiers 172 and 174 are arranged to have equal gain in the linear response range of amplifier 148. Also the outputs of the amplifiers 172 and 174 are arranged to be in phase opposition to one another. The comparator amplifier 176 produces an output that is the algebraic summation of the outputs of the amplifiers 172 and 174 and is therefore zero in the range of linear response of amplifier 174, as indicated by the heavy line segment 178 in FIG. 9b. A non-zero output commences at the level 180, which level corresponds to initial clipping of the incoming wave by the amplifier 174. Beginning with level 182 the output of amplifier 176 follows the generally straight line pattern 184 corresponding to the flat response range of amplifier 174. The output of comparator 176 is applied to a rectifier 186 arranged to rectify and filter the negative peaks of the incoming wave. The rectified output is applied over line 188 through a summing resistor 190 as a further input to the sensitivity control 154, and ultimately as a contribution to the gain control bias amplifier 120 over line 142. The zero volt output range 178 corresponds to the range of substantially constant receiver output volume in simulation of the automatic volume control effect of an actual receiver. Fading of the signal commences at the level 180; in the limit as the height above the transmitter is sufficiently large the bias voltage applied to the line 188 follows the characteristic 184 and as such is effective ultimately to contribute towards receiver silence. The fact of zero $H_M$ input signal to the function generator 148 in the case of flight location without the broadcast range of all simulated marker transmitters is of no moment insofar as receiver silence is concerned; this is effected by the large $D_M$ signal applied to the amplifier 144.

The effects of the variation of the $D_m$ and $H_m$ signals may be summarized as follows. With the craft directly above the station, the $D_m$ signal is zero and therefore the gain of amplifier 120 and the audio signal strength is at a maximum, and this is true independently of the height of the craft above the station, except as ultimately limited by the action of function generator 148. The function generator 146 contributes nothing to the audio signal strength. The $D_m$ signal is zero, so that variations in the gain of amplifier 144 due to changing $H_m$ signal cannot affect the audio signal strength.

Assume that the craft is within the conical part of the radiation beam at a location other than directly above the station ($D_m$ non-zero) and rising ($H_m$ increasing). Initially the signal appearing on line 170 will increase in accordance with the relation defined by curve 158 (FIG. 9a), so that the gain of amplifier 144 is decreased, and hence the gain of amplifier 120 and the audio signal strength increased. Above a limiting height, defined by curve 160 (FIG. 9a), the signal appearing on line 170 remains constant so that the audio signal strength becomes independent of further increase in height until a further limiting height is reached where function generator 148 becomes effective ultimately to produce fade-out. Thus in the region of the cylindrical part of the radiation pattern, the receiver intensity is independent of height. In the region of the conical part, it decreases as the height above the station decreases down to a limiting height, as at the edge of the "cone," where the receiver fades out. In the horizontal plane ($H_m$ constant), increasing $D_m$ reduces the gain of amplifier 120 and hence the audio signal strength, until the limit of the "cone" or "cylinder" is reached, where the signal fades out.

The described variation of audio intensity with varying height and effective horizontal distance from the simulated marker transmitter resembles very closely the so-called "rose-leaf" radiation pattern of an actual marker transmitter. The inclusion of the function generator 148 is optional, as previously stated, since in most training exercises the simulated craft is "flown" close to the runway.

The function generator 148 will for purposes of the present invention be referred to as an "amplitude sensitive amplifier." The characteristic response curve of an amplitude sensitive amplifier as comprehended herein are as a minimum, a region of substantially zero or other constant output corresponding to 178, and a region of substantially linear output corresponding to 184. The manner of junction of the region, whether curved as indicated in FIG. 9b or otherwise is not essential for qualification within this definition. Accordingly the amplitude sensitive function may alternately be generated as follows. The amplifier-limiter 174 is replaced by a voltage source providing an A.C. reference voltage of fixed magnitude and phase opposite to the phase of the voltage amplified by amplifier 172. A relay is provided that senses whether the output of amplifier 172 is at least equal to, or less than the reference voltage. A set of contacts of such relay is connected in the output circuit of comparison amplifier 176, alternatively to connect the input of rectifier 186 to the output of amplifier 176, and to ground, in accord with the respective conditions sensed by the relay.

It is apparent that the flat portion of the response characteristic of the amplifier-limiter 174 is not essential for the generation of the amplitude sensitive amplification function; all that is necessary for such generation is that a response portion with a slope differing from that of amplifier 172 be provided in place of the flat limiter response portion. Accordingly the amplifier-limiter 174 may be replaced by a so called "multilinear" or "multiple slope" amplifier, more specifically herein by a "bilinear" or "dual slope" amplifier. Such bilinear amplifier functions analogously to amplifier-limiter 174 relative to amplifier 172 in the range of linear amplification of amplifier-limiter 174. At a level corresponding to level 180, the bilinear amplifier experiences a change in gain. To this end means are provided for comparing the output voltage of the bilinear amplifier with a reference voltage of fixed magnitude (corresponding to level 180) and phase opposite to that of such output voltage. At level 180 the net compared voltage is zero; that is sensed by a suitable relay that is effective to change the gain of the bilinear amplifier, doubling it for example, as by switching in or out of a resistor included in a voltage divider circuit of the bilinear amplifier, or in an output load circuit or feed back circuit thereof. The relay switching also connects the reference voltage as a further input voltage to the comparison amplifier 176. For an example of a bilinear amplifier that does not require relays, reference is made to my application S.N. 836,472, filed August 27, 1959.

The described simulated radio receiver matches accurately the performance of an actual receiver particularly with regard to fidelity of response with changing flight position, representation of radiation pattern in the X—Y plane and also in the third dimension. Moreover the timing of response is highly realistic owing to the electronic gain control means provided.

Many modifications of the apparatus herein described are possible. For example, as previously mentioned, the basic analog voltages that give rise to the gain control voltages, could be direct rather than alternating. In such case the generation of the aforesaid limiter function proves to be very simple; the increasing negative analog voltage is applied to a conventional direct voltage amplifier, ultimately cutting the same off to produce the flat response region. Such an amplifier may be readily combined with a suitable linear amplifier to produce the aforesaid amplitude sensitive amplification characteristics. Accordingly it is intended that the definition of limiter, limiter function generator, amplitude sensitive amplification be applicable to direct voltage systems as well.

In the case of a direct voltage system the inductive resolver 56 must be replaced by a D.C. means for axis rotation. One well-known axes rotator includes a pair of sine-cosine potentiometers, each provided with a pair of brushes displaced by 90°. The potentiometers are energized by the voltages $X_{ILS}$ and $Y_{ILS}$ respectively, and the brush pairs are positioned by the instructor to the angle $\theta_R$. The voltages $X_{ILS} \cos \theta_R$ and $-Y_{ILS} \sin \theta_R$ are combined in a summing amplifier to mechanize Equation 2; and similarly the voltages $Y_{ILS} \cos \theta_R$ and $X_{ILS} \sin \theta_R$ are combined in another summing amplifier to mechanize Equation 1. Such resistive rather than inductive resolution may also be employed in an A.C. system. For a more detailed description of the just described resistive axes rotator reference is made to the aforesaid Steiner patent.

It should be understood that this invention is not limited to specific details of construction and arrangement thereof herein illustrated, in that still further changes and modifications may occur to one skilled in the art without departing from the spirit of the invention.

I claim:

1. In a simulated radio navigational aids system having computing means producing a pair of electrical signals that are respectively variable in accordance with the supposed effective ground and elevational distances of a simulated craft with respect to a fictitious navigational aids signal radio transmitting station having a generally conical radiation pattern, and means providing audio frequency signals representing an audio signal transmitted by said station: an improved simulated radio receiving system comprising a first variable gain amplifier for amplifying said audio frequency signals, means providing perceptible indication of said amplified audio frequency signals, a first electronic function generating means including a second variable gain amplifier, said function generating means receiving said ground distance signal as an input signal and delivering an output signal that generally increases in magnitude with increase in ground distance, means to apply said output signal as an electronic gain control signal to said first variable gain amplifier to decrease its gain with increasing ground distance, a second electronic function generating means receiving said elevational distance signal as input signal and delivering an output signal that generally increases in magnitude with increase in elevational distance up to a predetermined elevation, and thereafter remains substantially constant with further elevation increase, means to apply the latter output signal as an electronic gain control signal to said second variable gain amplifier to decrease its gain, and thereby increase the gain of said first variable gain amplifier with increasing elevational distance up to said predetermined elevation, and to render the gains of both variable gain amplifiers substantially constant with further elevational increase beyond said predetermined elevation, a third electronic function generating means also receiving as input signal said elevational distance signal and delivering an output signal that is substantially constant up to a second predetermined elevation substantially greater than the first predetermined elevation, and increases in magnitude with increasing elevation thereafter, and means to apply the last-mentioned output signal as an additional electronic gain control signal to said first variable gain amplifier to decrease its gain for elevations above said second predetermined elevation, whereby to simulate: a conical radiation pattern up to said first predetermined elevation, audio frequency output increasing with increasing elevation; thereabove, a cylindrical radiation pattern up to said second predetermined elevation, audio frequency output constant with increasing elevation; and thereabove, gradual fadeout with increasing elevation.

2. A receiver as specified in claim 1, wherein the second function generator is a limiter function generator effective to provide a simulated conical-cylindrical radiation pattern.

3. A receiver as specified in claim 1, wherein the elevational distance signal is an alternating signal and the second function generator comprises an amplifier-limiter energized by said alternating signal, and a rectifier energized by said amplifier-limiter and providing the aforesaid electronic gain control signal for the second variable gain amplifier, whereby the simulated radiation pattern is substantially conical-cylindrical.

4. A receiver as specified in claim 1 wherein the third function generator comprises a substantially linear amplifier and an amplifier-limiter each energized by the elevational distance signal, the gain of said amplifier-limiter in its region of substantially linear amplification being substantially equal to that of said linear amplifier, and means providing a signal representing the difference of the output signals of said linear amplifier and amplifier-limiter and serving as the aforesaid additional electronic gain control signal for the first variable gain amplifier.

References Cited in the file of this patent

UNITED STATES PATENTS

| | | |
|---|---|---|
| 2,366,603 | Dehmel | Jan. 2, 1945 |
| 2,475,314 | Dehmel | July 5, 1949 |
| 2,510,385 | Dehmel | June 6, 1950 |
| 2,529,468 | Dehmel | Nov. 7, 1950 |
| 2,560,528 | Dehmel | July 10, 1951 |
| 2,715,782 | Cooper | Aug. 23, 1955 |
| 2,721,397 | Gallo | Oct. 25, 1955 |
| 2,791,842 | Kennedy | May 14, 1957 |
| 2,811,788 | Gallo | Nov. 5, 1957 |
| 2,938,277 | Hunt | May 31, 1960 |